Dec. 15, 1931.  H. W. ATKINS  1,836,009
BLADE DISINFECTING DEVICE FOR PRUNING SHEARS
Filed May 31, 1930
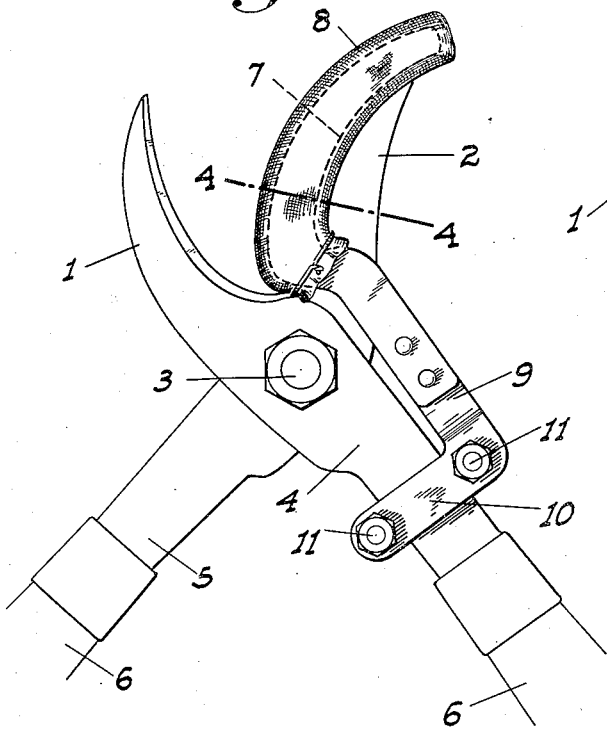
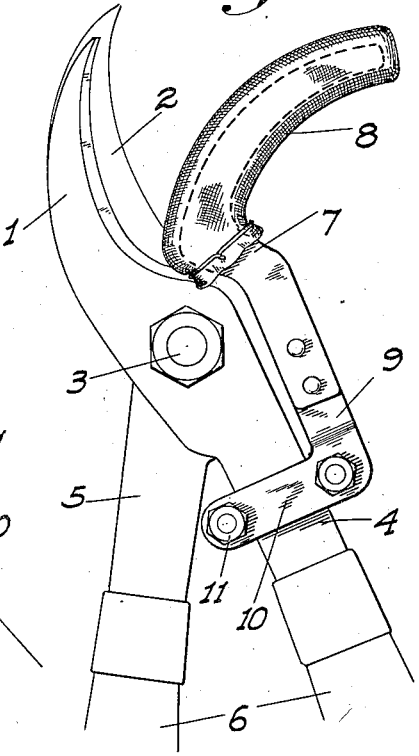
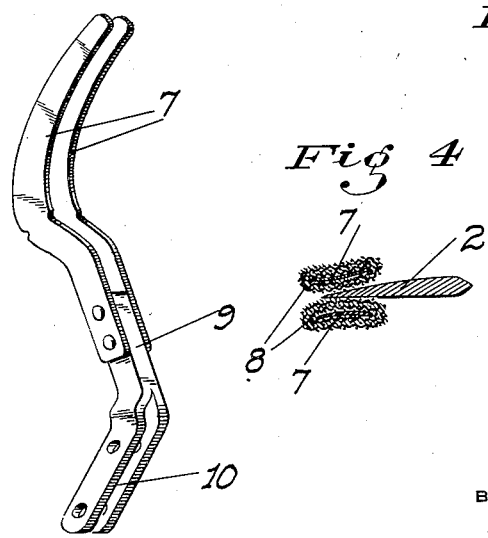
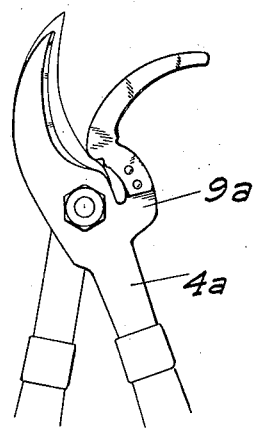
INVENTOR
H. W. Atkins
BY
ATTORNEY Patented Dec. 15, 1931

1,836,009

UNITED STATES PATENT OFFICE

HENRY W. ATKINS, OF HOOD, CALIFORNIA

BLADE DISINFECTING DEVICE FOR PRUNING SHEARS

Application filed May 31, 1930. Serial No. 458,054.

This invention relates to device for keeping the cutting blade of a pruning shears disinfected while in use, and is particularly valuable for use in the pruning of pear trees affected with pear blight, or in other trees or plants having diseases of a similar nature.

When trees are pruned in such diseased condition the good wood is easily infected with the blight if the shears are not disinfected, and are used first to prune a diseased limb and then immediately after used to prune healthy wood. The danger of this infection is well recognized by orchardists and it is customary to dip the shears after each cut, into a receptacle containing a suitable disinfecting solution. Pruning operations however are usually performed by hired help who are apt to be careless and do not take the trouble to thus dip the shears, or do so but infrequently. As a result pruned trees frequently retain the disease and are soon in no better condition than before the pruning.

One means of keeping the blades disinfected is shown in my Patent No. 1,640,635 dated August 30, 1927; and while this structure is very efficient for its purpose, it necessitates the shears being of special design and somewhat expensive to manufacture.

The principal object of my present invention is to provide a blade disinfecting device for the purpose which avoids the need or use of any special type of shears, since it is in the form of an attachment which may be readily applied to any standard pruning shears; and which when thus applied need only be dipped into the disinfecting solution at relatively long intervals, instead of after every cut. The device is so arranged that it does not interfere in any way with the manipulation or cutting action of the shears and when its use is no longer necessary it may be quickly removed.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a fragmentary side elevation of a pruning shears showing my disinfecting attachment applied thereto and in position to engage and disinfect the cutting blade.

Fig. 2 is a similar view showing the location of the attachment when the blades are brought together in a cutting action.

Fig. 3 is a perspective view of the frame portion of the attachment detached.

Fig. 4 is a cross section of the attachment taken on the line 4—4 of Fig. 1.

Fig. 5 is a fragmentary side elevation of a shears showing the device as formed integral with or permanently secured to the shears.

Referring now more particularly to the characters of reference on the drawings, and particularly at present to Figs. 1 to 4, the pruning shears illustrated comprises the usual cooperating jaws 1 and 2, the former being of hook form and the latter a convex-edged cutting blade of wedge shaped cross section. The jaws are pivotally mounted in connection with each other by the customary bolt 3 which passes through the shanks 4 and 5 of the jaws 1 and 2 respectively. Said shanks beyond the pivotal bolt are secured to the usual operating handle 6.

My blade disinfecting device which is applied to such standard shears comprises a pair of fingers 7 which are disposed to the sides of the plane of the blade 2 and extending for the full height of the same. The forward edges of these fingers or those which face the jaw 1 are curved to conform to the curvature of the cutting edge of the blade 2. The fingers are covered with absorbent and sponge-like or compressible sleeves 8 of suitable fabric or other material. These sleeves are removable from the fingers so that they may be easily replaced when worn out by frictional engagement with the blade or deterioration from constant immersion in the disinfecting solution.

At their lower ends these fingers are rigidly secured in common to an arm 9 which extends above and in substantially transverse alinement with the shank 5 to a point beyond the plane of swivel movement of said shank. At such end the arm is formed with a transversely offset right angle yoke or fork 10 which is adapted to straddle the shank 4 and to be removably clamped thereto by bolts 11. These bolts pass through the yoke and not through the shank, so that it is not necessary to drill the shank or work on the same in any way when applying my attachment thereto.

The fingers are disposed at such an angle relative to the jaw 1 and shank 4, that when the jaws are spread wide apart, as is done prior to engaging the jaws with a limb to be pruned, the fingers and sleeves thereon will lie in transverse alinement with the blade 2 and will project slightly ahead of the cutting edge of said blade as shown in Fig. 4. With the spreading or opening movement of the jaws the blade 2 backs in between the finger-sleeves, as will be evident. The back edge of the blade 2 is preferably ground off somewhat along the sides so as to remove the sharp edges usually found and thus facilitate the entrance of the blade into the space between the sleeves. The fingers are preferably of resilient material so that they can flex in a transverse plane. They may therefore spread the necessary extent to allow the thick back portion of the blade to pass therebetween, and will then close about the thin or sharp edged portion. In this manner the entire surface of the blade is engaged with the sleeves which are maintained saturated with disinfecting solution. The sleeves are thick enough and of an absorbent nature so as to retain a reasonable amount of the solution therein, or so as to properly disinfect the blade even after numerous engaging movements of the blade with the sleeves has taken place.

The fingers being rigid with the body 1 and being always as far from the same as is the blade 2 when the jaws are widely separated, they offer no interference with the engagement of the shears with a limb or with the cutting action of the blade.

If desired the finger-securing arms 9 may be formed with or permanently secured to the jaw shank 4a at a suitable point as illustrated at 9a in Fig. 5.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A blade disinfecting attachment for a pruning shears having cooperating jaws, one of which is formed as a cutting blade, said attachment including liquid retaining elements disposed to the sides of the cutting blade to contact with the cutting edge thereof on both sides, and means for mounting said elements in a fixed position relative to the other jaw of the shears.

2. A blade disinfecting attachment for a pruning shears having cooperating jaws one of which is formed as a cutting blade, said attachment including liquid retaining elements disposed to the sides of the cutting blade to contact with the cutting edge thereof on both sides, transversely resilient fingers supporting said elements, and a rigid support for said fingers secured in connection with the other jaw of the shears.

3. A blade disinfecting attachment for a pruning shears having cooperating jaws, one of which is formed as a cutting blade, said attachment including liquid retaining elements disposed to the sides of the cutting blade to contact with the cutting edge thereof on both sides, said elements being in the form of sleeves, relatively rigid fingers projecting into the sleeves and supporting the same, and a rigid support to which the lower ends of the fingers are secured, said support being adapted to be secured to the shank of the other jaw of the shears.

4. A blade disinfecting attachment for a pruning shears having cooperating jaws, one of which is formed as a cutting blade, said attachment including liquid retaining elements disposed to the sides of the cutting blade to contact with the cutting edge thereof on both sides, fingers supporting said elements, an arm to which the lower ends of the fingers are secured extending in the transverse plane of the shank of said blade but out of the path of movement of the shank, and an offset yoke on the outer end of the arm adapted to straddle and be clamped onto the shank of the other jaw of the shears.

5. A blade disinfecting attachment for a pruning shears having cooperating jaws, one of which is formed as a cutting blade, said attachment including liquid retaining elements disposed to the sides of the cutting blade to contact with the cutting edge thereof on both sides, and means for mounting said elements in fixed relation to the other jaw and in a position such as to engage the blade only when the jaws are spread apart.

6. A blade disinfecting device for a pruning shears having co-operating jaws, one of which is formed as a cutting blade; said device including a liquid retaining element having a longitudinal curvature symmetrical to that of the cutting edge of the blade, and means to mount said element in connection with the shears so that the blade will contact throughout its length with the said element when the blade is in a retracted position.

7. A blade disinfecting device for a pruning shears having co-operating jaws, one of which is formed as a cutting blade; said device including a liquid retaining element having a longitudinal curvature symmetrical to that of the cutting edge of the blade, and means to mount said element in connection with the shears in contacting relation to the blade along said edge when the blade occupies a predetermined position relative to the other jaw of the shears.

8. A blade disinfecting device for a pruning shears having co-operating jaws, one of which is formed as a cutting blade; said device including a liquid retaining element disposed to the side of the cutting blade to contact with the cutting edge thereof, and means to mount said element in a fixed position relative to the other jaw of the blade.

9. A blade disinfecting device for pruning shears having co-operating jaws, one of which is formed as a cutting blade; said device including a liquid retaining element having a longitudinal curvature symmetrical to that of the cutting edge of the blade, and of hollow sleeve-like form open on one end, and means to mount said element on the shears in position to engage the blade adjacent its cutting edge, said means including a finger to project into the element from its open end and removably supporting the element.

In testimony whereof I affix my signature.

HENRY W. ATKINS.